(12) United States Patent
Ogawa

(10) Patent No.: US 10,461,417 B2
(45) Date of Patent: Oct. 29, 2019

(54) POWER FEED CIRCUIT AND ANTENNA DEVICE

(71) Applicant: Hitachi Metals, Ltd., Tokyo (JP)

(72) Inventor: Tomoyuki Ogawa, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/772,974

(22) PCT Filed: Nov. 20, 2015

(86) PCT No.: PCT/JP2015/082731
§ 371 (c)(1),
(2) Date: May 2, 2018

(87) PCT Pub. No.: WO2017/085871
PCT Pub. Date: May 26, 2017

(65) Prior Publication Data
US 2018/0323509 A1 Nov. 8, 2018

(51) Int. Cl.
*H01Q 3/28* (2006.01)
*H01Q 3/26* (2006.01)
(Continued)

(52) U.S. Cl.
CPC ............. *H01Q 3/26* (2013.01); *H01Q 3/28* (2013.01); *H01Q 3/34* (2013.01); *H01Q 21/065* (2013.01);
(Continued)

(58) Field of Classification Search
CPC .......... H01Q 3/26; H01Q 3/34; H01Q 21/065; H01Q 21/22; H01Q 21/245; H01Q 21/28;
(Continued)

(56) References Cited

U.S. PATENT DOCUMENTS 8,462,047 B1   6/2013 Ai et al.
9,673,882 B2   6/2017 Ai et al.
(Continued)

FOREIGN PATENT DOCUMENTS

| EP | 2538578 A2 | 12/2012 |
| JP | 5324014 B2 | 10/2013 |
| WO | WO 2010/059186 A2 | 5/2010 |

OTHER PUBLICATIONS

English translation of International Preliminary Report on Patentability dated May 31, 2018 together with the Written Opinion received in related International Application No. PCT/JP2015/082731.
(Continued)

*Primary Examiner* — Graham P Smith
(74) *Attorney, Agent, or Firm* — Scully, Scott, Murphy & Presser, PC

(57) ABSTRACT

A power feed circuit for feeding power to first through fifth antenna elements sequentially arranged in a horizontal direction includes a 90-degree hybrid circuit including two input terminals and two output terminals, an equal distribution circuit that the power-feed signal output from one of the output terminals is equally distributed and output to the second and fourth antenna elements, and a distribution circuit that power-feed signal output from the other of the output terminals is distributed and output to the first, third and fifth antenna elements. The distribution circuit distributes such that electrical power output to the first and fifth antenna elements is equal and that a sum of electrical power output to the first and fifth antenna elements is not more than that output to the third antenna element. A phase-inverted power is fed to the third antenna element and either one of the second and fourth antenna elements.

8 Claims, 10 Drawing Sheets

(51) Int. Cl.
*H01Q 21/28* (2006.01)
*H01Q 3/34* (2006.01)
*H01Q 21/06* (2006.01)
*H01Q 21/22* (2006.01)
*H01Q 21/24* (2006.01)
*H01Q 25/00* (2006.01)
*H04B 7/06* (2006.01)
*H01Q 1/24* (2006.01)
*H01Q 21/20* (2006.01)

(52) U.S. Cl.
CPC ........... *H01Q 21/22* (2013.01); *H01Q 21/245* (2013.01); *H01Q 21/28* (2013.01); *H01Q 25/00* (2013.01); *H04B 7/0617* (2013.01); *H04B 7/0671* (2013.01); *H01Q 1/246* (2013.01); *H01Q 21/205* (2013.01)

(58) Field of Classification Search
CPC ...... H01Q 25/00; H01Q 1/246; H01Q 21/205; H04B 7/0671
USPC ....................................................... 343/893
See application file for complete search history.

(56) References Cited

U.S. PATENT DOCUMENTS

2003/0112172 A1  6/2003  Shinoda
2013/0278460 A1  10/2013  Ai et al.

OTHER PUBLICATIONS

International Search Report dated Feb. 9, 2016 issued in PCT/JP2015/082731.

POWER FEED CIRCUIT AND ANTENNA DEVICE

TECHNICAL FIELD

The present invention relates to a power feed circuit for dual-beam antenna, and an antenna device.

BACKGROUND ART

A dual-beam antenna (also called twin beam antenna) is known which radiates two beams in different directions using common plural antenna elements arranged in the horizontal direction (see, e.g., JP 5324014 B2 and WO 2010/059186 A2).

Power feed circuit for dual-beam antenna has two power feed terminals for inputting a power-feed signal and is configured that the power-feed signal input from the two input terminals is distributed to each antenna element, and the power and phase of the power-feed signal supplied to each antenna element are respectively adjusted, thereby adjusting the radiation directions, etc., of two beams.

JP 5324014 B2 and WO 2010/059186 A2 disclose the configurations of power feed circuit when three, four or six antenna elements are arranged horizontally.

SUMMARY OF INVENTION

Technical Problem

In the recent years, coverage areas of base-station antennas for mobile communication particularly in urban areas are divided into plural sectors to improve capacity and transmission speed. In case of, e.g., six-sector base station, a coverage area is divided into six 60-degree sectors in a horizontal plane.

Antenna devices used in six-sector base station have a full width at half maximum (FWHM) of about 33° and is required to have low sidelobe directional characteristics in a horizontal plane so as not to affect communications in other sectors.

However, if the number of horizontally-arranged antenna elements is set to be three or four as in JP 5324014 B2 and WO 2010/059186 A2, a beam width is too wide and it is difficult to achieve an FWHM suitable for the six-sector base station.

Also, if the number of horizontally-arranged antenna elements is set to be six, the configuration of the power feed circuit is complicated and this may result in an increase in size of the circuit or an increase in internal loss.

Thus, it is an object of the invention to provide a power feed circuit for a dual-beam antenna that can easily achieve an FWHM suitable for a six-sector base station with a simple structure, and an antenna device.

Solution to Problem

To solve the above problem, the invention provides a power feed circuit for feeding power to first through fifth antenna elements sequentially arranged in a horizontal direction, the circuit comprising: a 90-degree hybrid circuit that comprises two input terminals for inputting a power-feed signal and two output terminals, equally distributes electrical power input from the two input terminals and outputs the distributed electrical power from the two output terminals and is configured such that the power-feed signal input from one of the input terminals is output to an other of the output terminals by being phase-delayed by 90 degrees relative to one of the output terminals, and that the power-feed signal input from an other of the input terminals is output to the one of the output terminals by being phase-delayed by 90 degrees relative to the other of the output terminals; an equal distribution circuit by which the power-feed signal output from the one of the output terminals is equally distributed and output to the second and fourth antenna elements; and a distribution circuit by which the power-feed signal output from the other of the output terminals is distributed and output to the first, third and fifth antenna elements, wherein the distribution circuit distributes such that electrical power output to the first and fifth antenna elements is equal and that a sum of electrical power output to the first and fifth antenna elements is not more than electrical power output to the third antenna element, and wherein a phase-inverted power is fed to the third antenna element and either one of the second and fourth antenna elements.

Also, to solve the above problem, the invention provides an antenna device comprising: first through fifth antenna elements sequentially arranged in a horizontal direction; and a power feed circuit that feeds power to each of the antenna elements, wherein the power feed circuit comprises a 90-degree hybrid circuit that comprises two input terminals for inputting a power-feed signal and two output terminals, equally distributes electrical power input from the two input terminals and outputs the same from the two output terminals and is configured such that the power-feed signal input from one of the input terminals is output to an other of the output terminals by being phase-delayed by 90 degrees relative to one of the output terminals, and that the power-feed signal input from an other of the input terminals is output to the one of the output terminals by being phase-delayed by 90 degrees relative to the other of the output terminals, an equal distribution circuit by which the power-feed signal output from the one of the output terminals is equally distributed and output to the second and fourth antenna elements, and a distribution circuit by which the power-feed signal output from the other of the output terminals is distributed and output to the first, third and fifth antenna elements, wherein the distribution circuit distributes such that electrical power output to the first and fifth antenna elements is equal and a sum of electrical power output to the first and fifth antenna elements is not more than electrical power output to the third antenna element, and wherein a phase-inverted power is fed to the third antenna element and either one of the second and fourth antenna elements.

Advantageous Effects of Invention

According to the invention, it is possible to provide a power feed circuit for a dual-beam antenna that can easily achieve an FWHM suitable for a six-sector base station with a simple structure, and an antenna device.

DESCRIPTION OF EMBODIMENTS

Embodiment

An embodiment of the invention will be described below in conjunction with the appended drawings.
Power Feed Circuit FIG. 1 is a schematic configuration diagram illustrating a power feed circuit in the present embodiment.

As a result of intensive study on an antenna device capable of achieving a FWHM of about 33° (more specifically, 30° to 33°±5°) which is suitable for a six-sector base station, the present inventors found that it is possible to easily achieve the FWHM suitable for the six-sector base station when the number of horizontally-arranged antenna elements is five and the circuit configuration of power feed circuit is devised.

Figure 1:
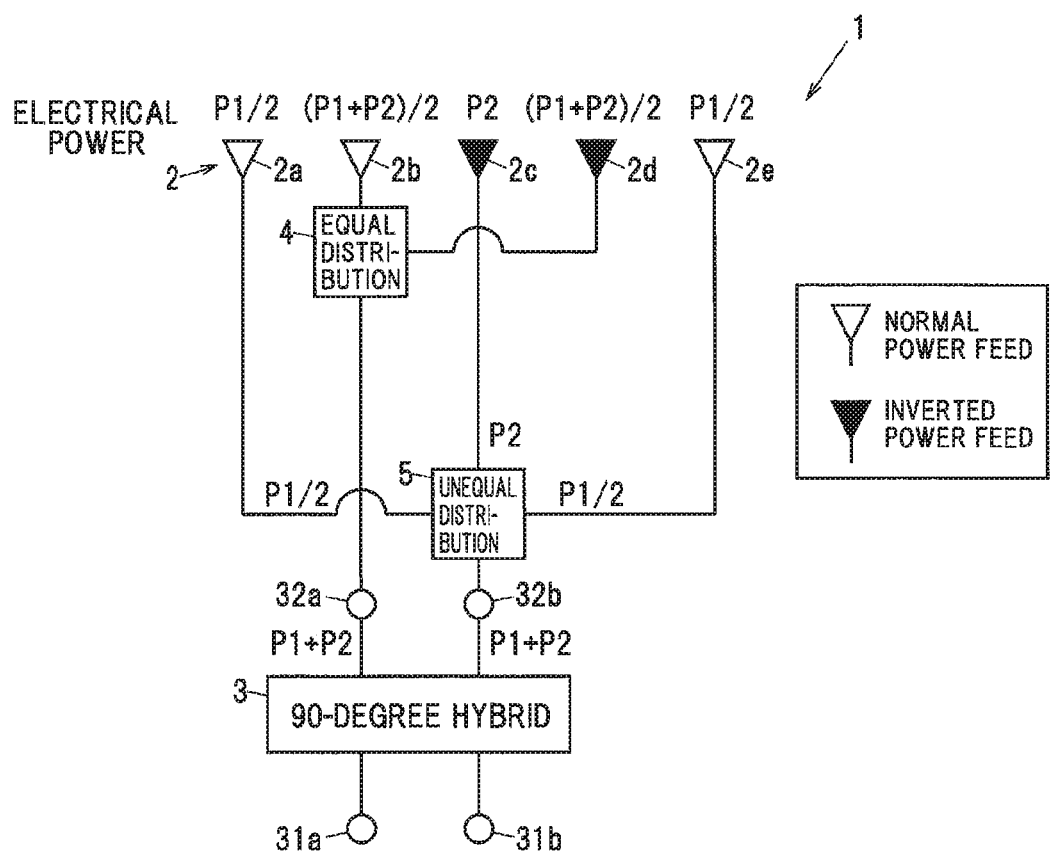
FIG. 1 is a schematic configuration diagram illustrating a power feed circuit in an embodiment of the present invention.

As shown in FIG. 1, a power feed circuit 1 in the present embodiment is a circuit which feeds power to five antenna elements 2 arranged in a horizontal direction. In this example, first to fifth antenna elements 2a to 2e are sequentially arranged in the horizontal direction. A specific configuration of an antenna device mounting the power feed circuit 1 will be described later.

The power feed circuit 1 is provided with a 90-degree hybrid circuit 3, an equal distribution circuit 4 and an unequal distribution circuit 5.

The 90-degree hybrid circuit 3 (also called 3 dB 90-degree hybrid circuit) has two input terminals 31a and 31b for inputting a power-feed signal, and two output terminals 32a and 32b.

The 90-degree hybrid circuit 3 is configured that power input from the two input terminals 31a and 31b is equally distributed and output from the output terminals 32a and 32b.

The 90-degree hybrid circuit 3 is also configured that the power-feed signal input from the input terminal 31a and output to the output terminal 32b is phase-delayed by 90 degrees with respect to the output terminal 32a, and the power-feed signal input from the input terminal 31b and output to the output terminal 32a is phase-delayed by 90 degrees with respect to the output terminal 32b.

The output terminal 32a of the 90-degree hybrid circuit 3 is electrically connected to an input of the equal distribution circuit 4. The output terminal 32b of the 90-degree hybrid circuit 3 is electrically connected to an input of the unequal distribution circuit 5. Since the specific configuration of the 90-degree hybrid circuit 3 is well-known, the explanation thereof is omitted.

The equal distribution circuit 4 is configured to equally distribute the power-feed signal output from the output terminal 32a of the 90-degree hybrid circuit 3 and then output the signal to the second and fourth antenna elements 2b and 2d. One output of the equal distribution circuit 4 is electrically connected to the second antenna element 2b and another output is electrically connected to the fourth antenna element 2d.

The unequal distribution circuit 5 is constructed from a 1-input/3-output distribution circuit, and is configured to distribute the power-feed signal output from the output terminal 32b of the 90-degree hybrid circuit 3 and then output the signal to the first, third and fifth antenna elements 2a, 2c and 2e.

The unequal distribution circuit 5 is also configured to distribute power so that the power output to the first and fifth antenna elements 2a and 2e is equal, and at the same time, the sum of the power output to the first and fifth antenna elements 2a and 2e is not more than the power output to the third antenna element 2c.

The equal distribution circuit 4, the unequal distribution circuit 5, each wiring between the circuits 3, 4 and 5, and wirings between the distribution circuits 4, 5 and each antenna element 2 may be microstrip lines formed using printed circuit board technology. Alternatively, the circuits 3, 4 and 5 and the antenna elements 2 may be integrally formed on a common printed circuit board.

Furthermore, the power feed circuit 1 is configured to feed a phase-inverted power to the third antenna element and 2c and the fourth antenna element 2d. In this example, inverted power feed is such that a phase-inverted power is fed to the third antenna element and 2c and the fourth antenna element 2d. The inverted power feed will be described in detail later.

However, it is not limited to the inverted power feed, and for example, a phase-shift circuit such as time-delay circuit may be inserted to feed a phase-inverted power to the third antenna element and 2c and the fourth antenna element 2d. In this case, however, the phase shifted by the phase-shift circuit may change due to the frequency of the power-feed signal. Therefore, especially when used in an antenna device with a wide frequency range, inverted power feed which can reliably invert the phase is more desirable.

Now, electrical power of the power-feed signal fed to each antenna element 2 will be described.

Given that power output from the unequal distribution circuit 5 to the first and fifth antenna elements 2a and 2e is P1/2 and power output from the unequal distribution circuit 5 to the third antenna element 2c is P2, the relation of P1≤P2 is satisfied.

In this case, power output from the output terminals 32a and 32b of the 90-degree hybrid circuit 3 is P1+P2, and power fed to the second and fourth antenna elements 2b and 2d is (P1+P2)/2.

In other words, the power feed circuit 1 is configure to satisfy the relation represented by (power supplied to the third antenna element 2c (=P2))≥(power supplied to the second and fourth antenna elements 2b and 2d (=(P1+P2)/2))>(power supplied to the first and fifth antenna elements 2a and 2e (=P1/2)), which means that the largest power is supplied to the antenna element 2 arranged at the middle (the third antenna element 2c) and the smallest power is supplied to the antenna elements 2 arranged at edges (the first and fifth antenna elements 2a and 2e).

It is generally known that when antenna elements are arranged in the horizontal direction, it is possible to reduce unwanted radiation and suppress sidelobes by feeding power so that the larger power is supplied to the antenna closer to the center and the smaller power is supplied to the antenna elements closer to the edges. In the power feed circuit 1, a ratio of P1 to P2 can be easily adjusted by the unequal distribution circuit 5, and it is possible to easily adjust a ratio of power supplied to each antenna element 2 and to suppress sidelobes.

To further suppress sidelobes, it is desirable to satisfy P1<P2, and also satisfy (power supplied to the third antenna element 2c)>(power supplied to the second and fourth antenna elements 2b and 2d)>(power supplied to the first and fifth antenna elements 2a and 2e).

Next, the phase of the power-feed signal fed to each antenna element 2 will be described.

Figure 2A:
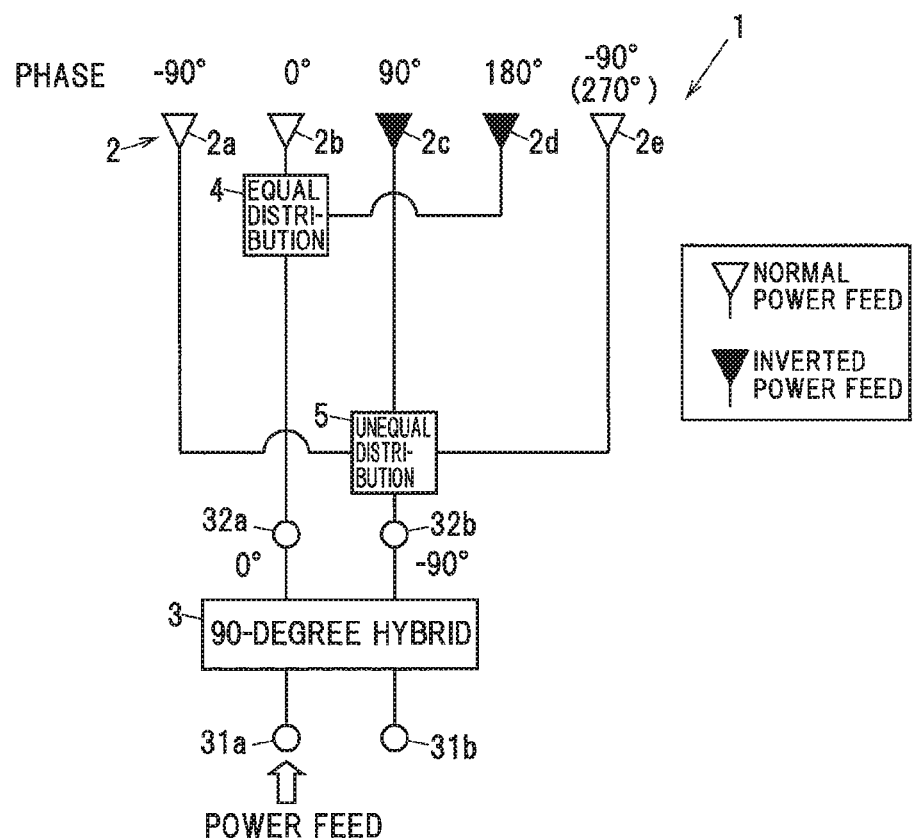
FIG. 2A is an explanatory diagram illustrating a phase of a power-feed signal supplied to each antenna element 2 when the power-feed signal is input from one of input terminals.

As shown in FIG. 2A, when the power-feed signal is input from the input terminal 31a located on the left side of the drawing, and given that the phase of the power-feed signal output from the output terminal 32a of the 90-degree hybrid circuit 3 is 0°, the phase of the power-feed signal output from the output terminal 32b is −90°.

The phase of the power-feed signal fed to the first and fifth antenna elements 2a and 2e is the same as the phase of the power-feed signal output from the output terminal 32b and is −90°. Also, the phase of the power-feed signal fed to the second antenna element 2b is the same as the phase of the power-feed signal output from the output terminal 32a and is 0°.

The phase of the power-feed signal fed to the third antenna element 2c is inverted with respect to the power-feed signal output from the output terminal 32b and is 90°. Also, the phase of the power-feed signal fed to the fourth antenna element 2d is inverted with respect to the power-feed signal output from the output terminal 32a and is 180°.

Figure 2B:
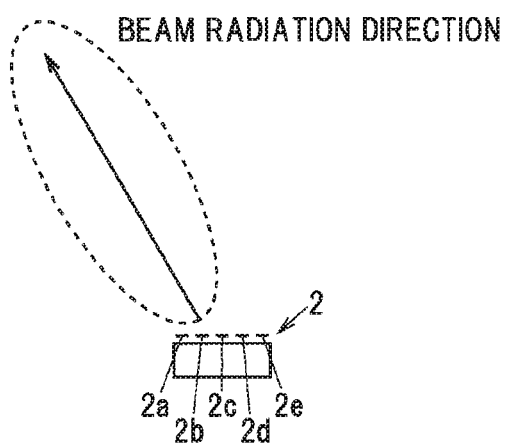
FIG. 2B is an explanatory diagram illustrating a beam radiation direction when the power-feed signal is input from the one of the input terminals.

Therefore, when the power-feed signal is input from the input terminal 31a located on the left side of the drawing, the phases of the first to fifth antenna elements 2a to 2e are respectively −90°, 0°, 90°, 180° and −90° (270°), which means that the phase of the power-feed signal supplied to each antenna element 2 is shifted by 90°. In this case, beam is radiated leftward in the drawing, as shown in FIG. 2B.

Figure 3A:
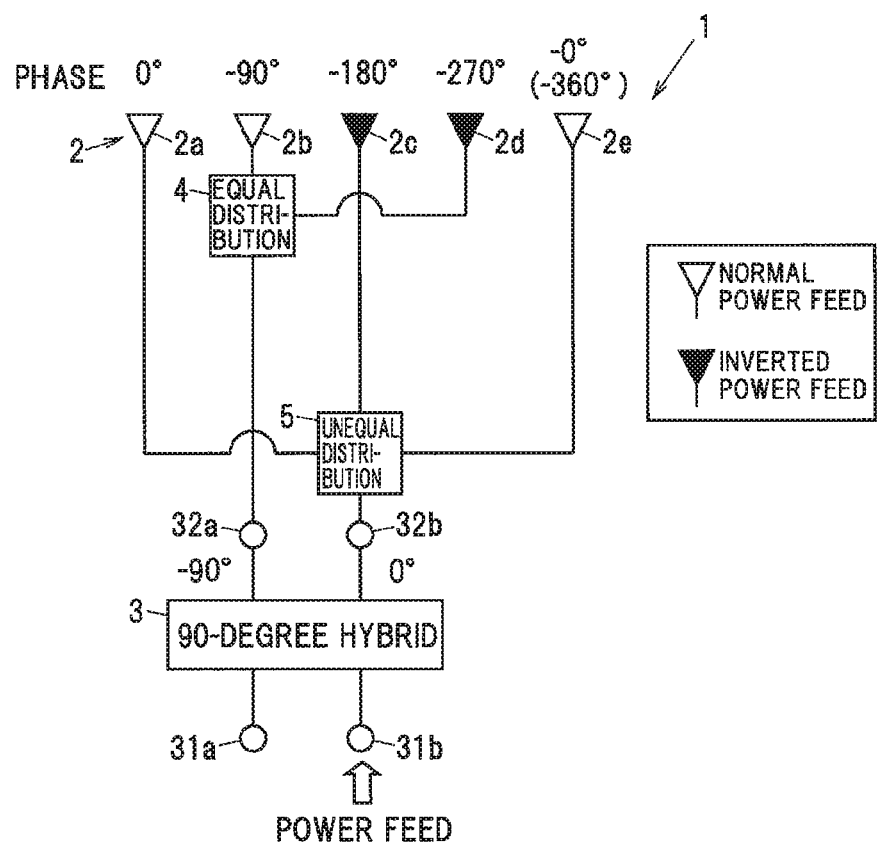
FIG. 3A is an explanatory diagram illustrating a phase of a power-feed signal supplied to each antenna element 2 when the power-feed signal is input from the other input terminal.

On the other hand, when the power-feed signal is input from the input terminal 31b located on the right side of the drawing, and given that the phase of the power-feed signal output from the output terminal 32b of the 90-degree hybrid circuit 3 is 0°, the phase of the power-feed signal output from the output terminal 32a is −90°, as shown in FIG. 3A.

The phase of the power-feed signal fed to the first and fifth antenna elements 2a and 2e is the same as the phase of the power-feed signal output from the output terminal 32b and is 0°. Also, the phase of the power-feed signal fed to the second antenna element 2b is the same as the phase of the power-feed signal output from the output terminal 32a and is −90°.

The phase of the power-feed signal fed to the third antenna element 2c is inverted with respect to the power-feed signal output from the output terminal 32b and is −180° (180°). Also, the phase of the power-feed signal fed to the fourth antenna element 2d is inverted with respect to the power-feed signal output from the output terminal 32a and is −270° (90°).

Figure 3B:
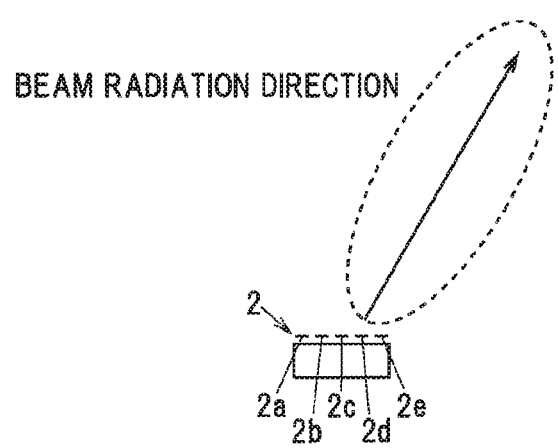
FIG. 3B is an explanatory diagram illustrating a beam radiation direction when the power-feed signal is input from the other input terminal.

Therefore, when the power-feed signal is input from the input terminal 31b located on the right side of the drawing, the phases of the first to fifth antenna elements 2a to 2e are respectively 0°, −90°, −180°, −270° and 0° (−360°), which means that the phase of the power-feed signal supplied to each antenna element 2 is shifted by 90°. In this case, beam is radiated rightward in the drawing, as shown in FIG. 3B.

The beam radiation direction can be adjusted by changing intervals of the antenna elements 2. When used in a six-sector base station, the intervals of the antenna elements 2 are adjusted so that an angle formed between the radiation directions of two beams output when feeding power from the both input terminals 31a and 31b is about 60° in a horizontal plane.

Modifications of Power Feed Circuit 1

Figure 4:
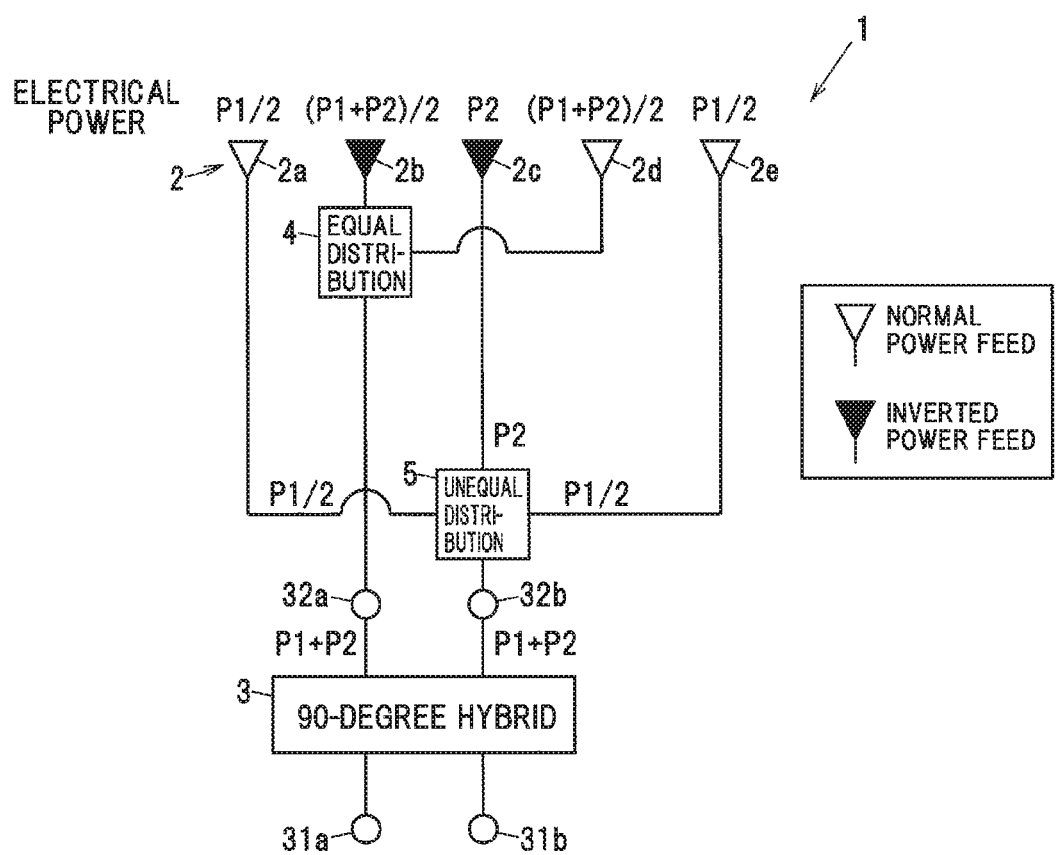
FIG. 4 is a schematic configuration diagram illustrating a power feed circuit in a modification of the invention.

Although a phase-inverted power is fed to the third and fourth antenna elements 2c and 2d in the present embodiment, it is not limited thereto. The phase-inverted power may be fed to the second and third antenna elements 2b and 2c, as shown in FIG. 4. In this case, the beam radiation directions are opposite to those in case of FIG. 1, such that the beam is radiated leftward in the drawing when the power-feed signal is input from the input terminal 31a located on the right side of the drawing, and the beam is radiated rightward in the drawing when the power-feed signal is input from the input terminal 31b located on the left side of the drawing.

Figure 5:
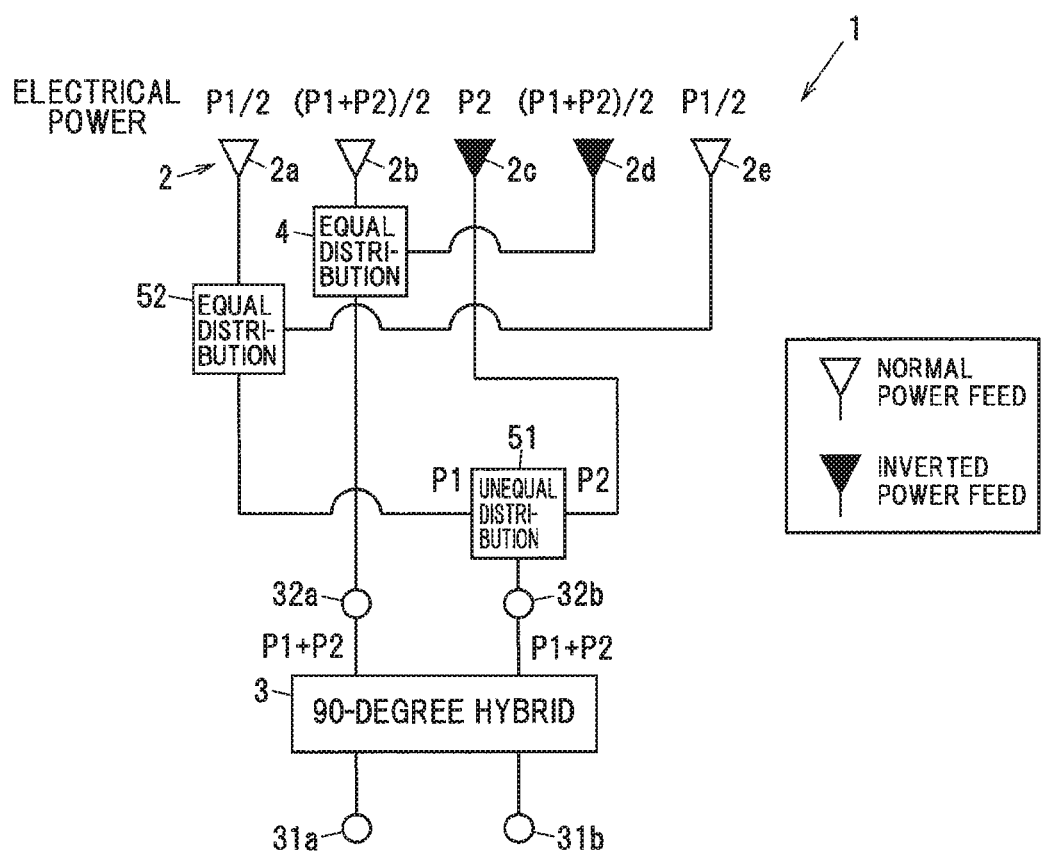
FIG. 5 is a schematic configuration diagram illustrating a power feed circuit in another modification of the invention.

Alternatively, instead of using the 1-input/3-output unequal distribution circuit 5, two distribution circuits; a 1-input/2-output unequal distribution circuit 51 and an equal distribution circuit 52 may be used, as shown in FIG. 5. In this case, the unequal distribution circuit 51 outputs power P2 to the third antenna element 2c and power P1 (where P1≤P2, preferably P1<P2) to the equal distribution circuit 52, and the equal distribution circuit 52 distributes the input power P1 to the first and fifth antenna elements 2a and 2e.

However, in the configuration shown in FIG. 5 in which the distribution circuits 51 and 52 are connected in multiple stages, a distribution ratio of the power to each antenna element 2 at a specific frequency may deviate from the desired value due to reflection, etc., particularly when used in an antenna device with a wide frequency range. In addition, connecting the distribution circuits 51 and 52 in multiple stages may lead to an increase in size of the circuit. Therefore, it is desirable to use the 1-input/3-output unequal distribution circuit 5 as shown in FIG. 1 particularly when used in an antenna device with a wide frequency range.

Configuration of Antenna Device

Figure 6A:
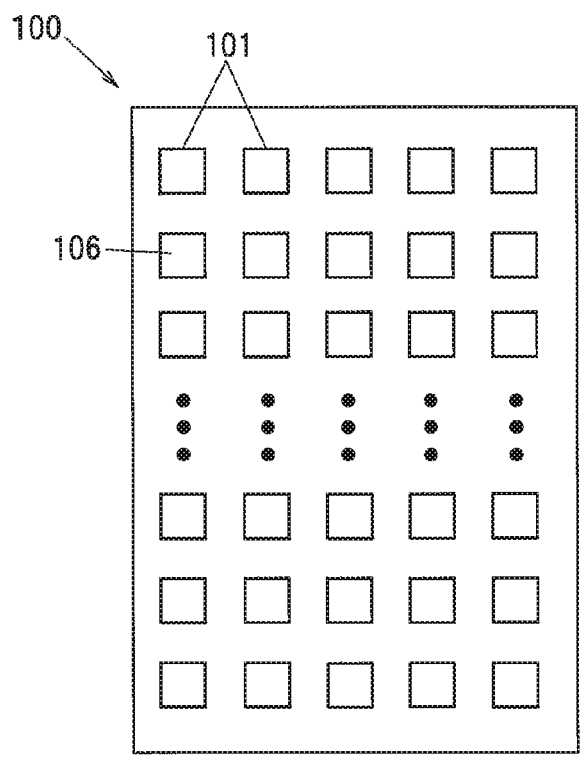
FIG. 6A is a schematic configuration diagram illustrating an antenna device in the embodiment of the invention.

Next, an antenna device mounting the power feed circuit 1 will be described. FIG. 6A is a schematic configuration diagram illustrating an arrangement of antenna elements in the antenna device, FIG. 6B is a cross sectional view showing a general configuration of the antenna element and FIG. 6C is an explanatory diagram illustrating a relation between a slot and a power feed line in the antenna element.

As shown in FIG. 6A, an antenna device 100 is formed by lining up antenna elements 101 horizontally (in a right-and-left direction of the drawing) and vertically (in an up-and-down direction of the drawing). In the present embodiment, five antenna elements 101 are arranged in each horizontal row. The number of rows arranged in the vertical direction (the number of tiers) can be appropriately set and is, e.g., 12 rows or 16 rows, etc.

Figure 6B:
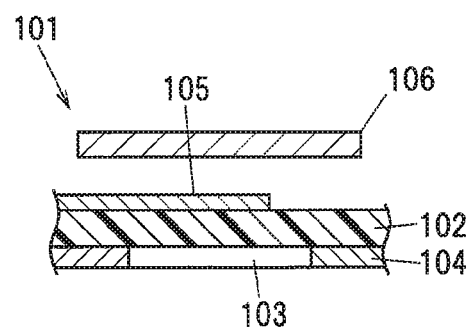
FIG. 6B is a cross sectional view showing a general configuration of an antenna element.
Figure 6C:
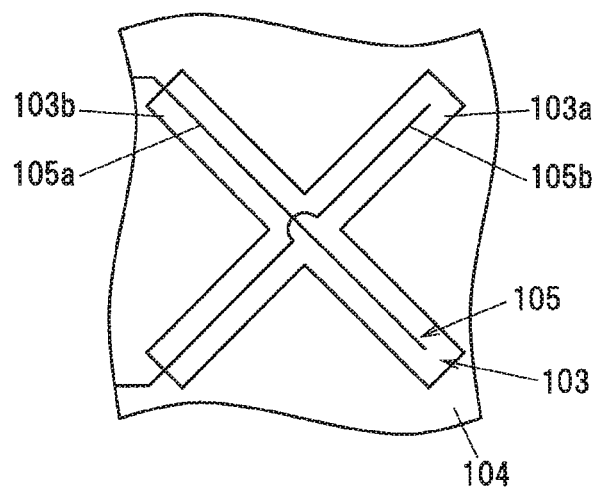
FIG. 6C is an explanatory diagram illustrating a relation between a slot element and a power feed line in the antenna element.

In the present embodiment, each antenna element 101 is constructed from a slot-coupled patch antenna, as shown in FIGS. 6B and 6C. The antenna element 101 has a slot-forming layer 104 which is a conductive layer formed on the back surface of a dielectric layer 102 and has a slot 103 penetrating the conductive layer, a power feed line 105 formed on the front surface of the dielectric layer 102 to feed power, and a rectangular plate-shaped radiation element 106 arranged to face the front surface of the dielectric layer 102 with a distance.

In the present embodiment, the slot 103 is formed in an X-shape, such that a first slot element 103a is inclined at 45° with respect to the vertical direction and a second slot element 103b is inclined at −45° with respect to the vertical direction.

The power feed line 105 is provided with a first power feed line 105a for feeding power to the first slot element 103a, and a second power feed line 105b for feeding power to the second slot element 103b.

The first power feed line 105a is formed to pass across the first slot element 103a in a lateral direction at the longitudinal center of the first slot element 103a, when viewed in plan. When power is fed through the first power feed line 105a, the first slot element 103a is excited to oscillation and is coupled to the radiation element 106, and radio waves are emitted. The radio wave emitted at this time is a polarized wave inclined at 45° with respect to the vertical direction.

Likewise, the second power feed line 105b is formed to pass across the second slot element 103b in a lateral direction at the longitudinal center of the second slot element 103b, when viewed in plan. When power is fed through the second power feed line 105b, the second slot element 103b is excited to oscillation and is coupled to the radiation element 106, and radio waves are emitted. The radio wave emitted at this time is a polarized wave inclined at −45° with respect to the vertical direction.

Five first slot elements 103a arranged in the horizontal direction correspond to the first to fifth antenna elements 2a to 2e in FIG. 1, and a power feed circuit 1 in the present embodiment is connected to these five first slot elements 103a.

Among the five first slot elements 103a, the first slot elements 103a corresponding to the third and fourth antenna elements 2c and 2d (the first slot elements 103a of the third and fourth antenna elements 101 from the left in FIG. 6A) are fed with a phase-inverted power.

Figure 7A:
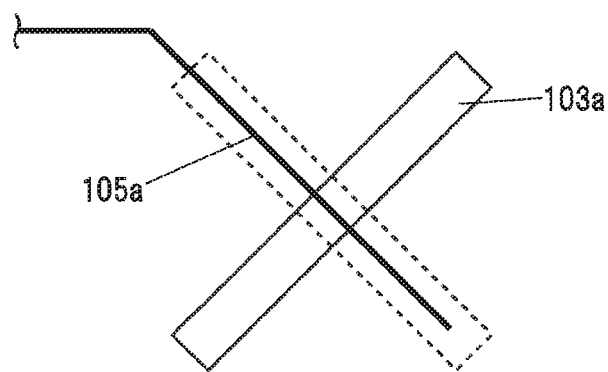
FIG. 7A is an explanatory diagram illustrating normal power feed to a first slot element.
Figure 7B:
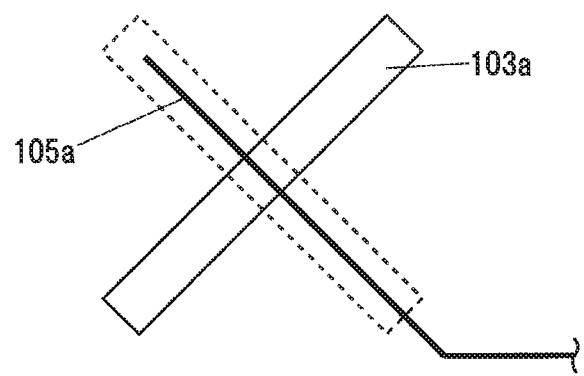
FIG. 7B is an explanatory diagram illustrating inverted power feed to the first slot element.

In case of a structure in which normal power is fed to the first slot element 103a by the first power feed line 105a extending from, e.g., the upper left to the lower right so as to intersect the first slot element 103a as shown in FIG. 7A, the direction of an electric current of the power-feed signal can be reversed with respect to the direction of FIG. 7A by extending the first power feed line 105a from the lower right to the upper left so as to intersect the first slot element 103a as shown in FIG. 7B, thereby realizing inverted power feed.

Likewise, five second slot elements 103b arranged in the horizontal direction correspond to the first to fifth antenna elements 2a to 2e in FIG. 1, and another power feed circuit 1 in the present embodiment is connected to these five second slot elements 103b. Among the five second slot elements 103b, the second slot elements 103b corresponding to the third and fourth antenna elements 2c and 2d are fed with a phase-inverted power.

In such a manner, in the antenna device 100, five horizontally-arranged slot elements 103a, 103b respectively form one set, and the power feed circuit 1 is connected to each set of the slot elements 103a or 103b.

Although it is not illustrated, an upstream power feed circuit is provided on the upstream side of each power feed circuit 1 to distribute the power-feed signal to each set of vertically arranged antenna elements 101 and to adjust the power and phase of the power-feed signal supplied to each set of antenna elements 101. By using the upstream power feed circuit to adjust the power and phase of the power-feed signal supplied to each set of antenna elements 101, it is possible to adjust radiation direction of vertical beam, i.e., electrical tilt angle.

Figure 8:
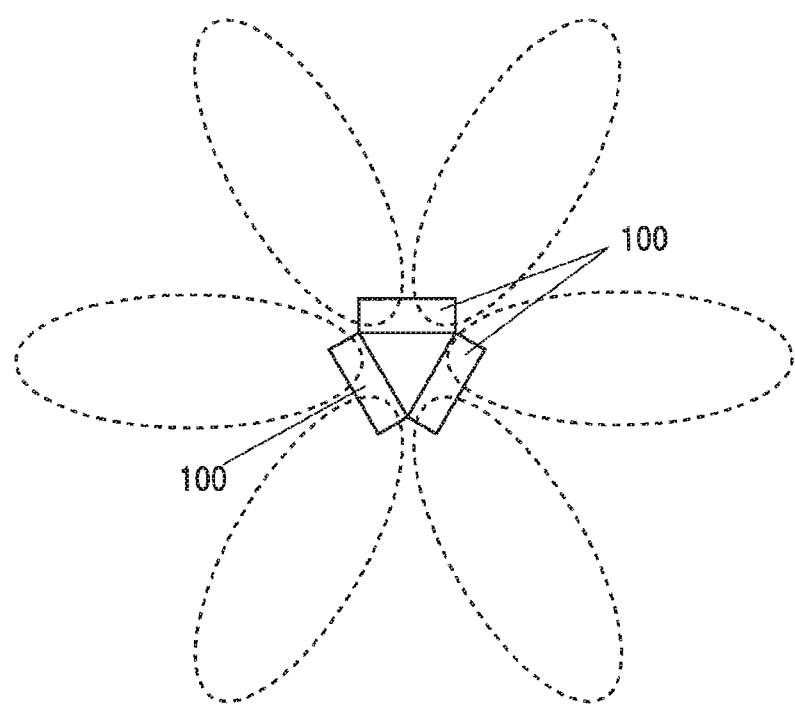
FIG. 8 is an explanatory diagram illustrating a six-sector base station using the antenna devices.

The antenna device 100 is a dual-beam antenna capable of radiating beams in two directions and can cover two sectors. Therefore, an antenna device for six-sector base station can be easily realized by using three antenna devices 100 as shown in FIG. 8. In FIG. 8, the beam radiation ranges are schematically illustrated by a dashed line.

Figure 9:
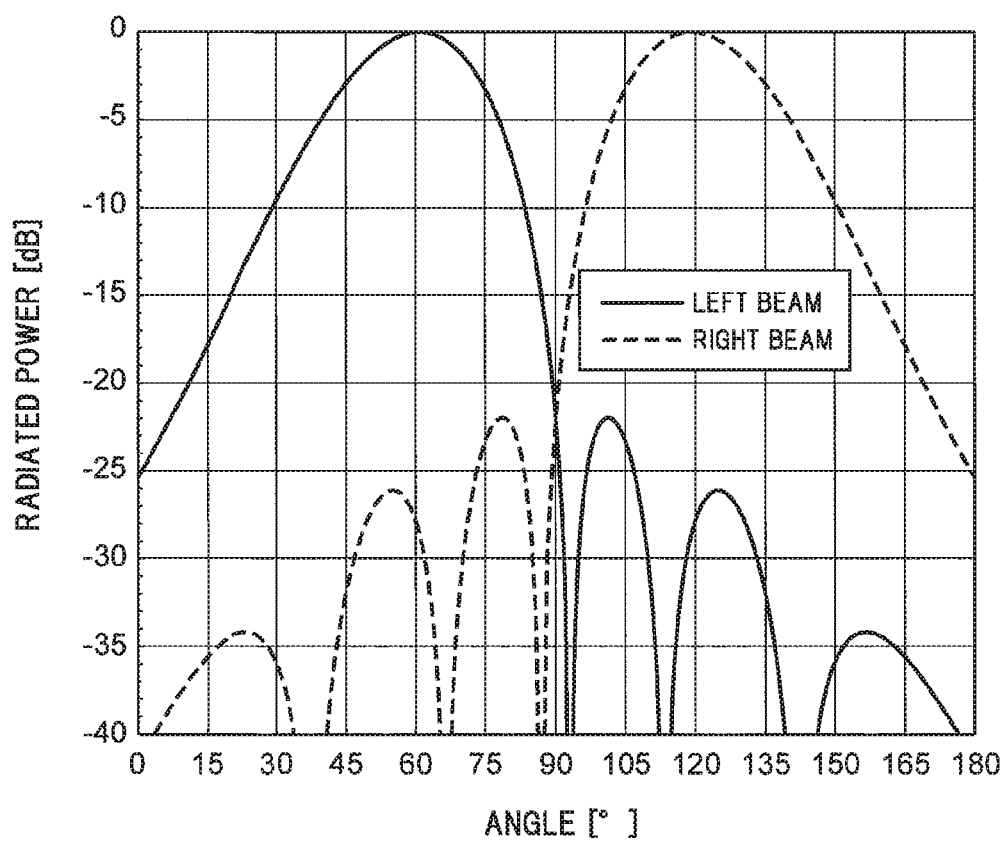
FIG. 9 is a graph showing radiation characteristics of the antenna device.

FIG. 9 shows the radiation characteristics of the antenna device 100. In FIG. 9, a left beam is a beam emitted when the power-feed signal is input from the input terminal 31a located on the left side of FIG. 1, and a right beam is a beam emitted when the power-feed signal is input from the input terminal 31b located on the right side of FIG. 1. The frequency of the power-feed signal is 1940 MHz, P1:P2 is 0.32:1, and the intervals of the antenna elements 101 in the horizontal direction and the horizontal direction are 65 mm.

The antenna device 100 exhibits a sidelobe level of as low as not more than −20 dB and a 3 dB beam width (FWHM) of about 30° in both the right and left beams as shown in FIG. 9, and is thus suitable as an antenna device for six-sector base station.

Functions and Effects of the Embodiment

As described above, the power feed circuit 1 in the present embodiment is to feed power to the first through fifth antenna elements 2a to 2e sequentially arranged in a horizontal direction, and is provided with the 90-degree hybrid circuit 3 which has the two input terminals 31a and 31b for inputting a power-feed signal and the two output terminals 32a and 32b, equally distributes electrical power input from the two input terminals 31a and 31b and outputs the same from the two output terminals 32a and 32b, and is configured that the power-feed signal input from the input terminal 31a and output to the output terminal 32b is phase-delayed by 90 degrees with respect to the output terminal 32a, and the power-feed signal input from the input terminal 31b and output to the output terminal 32a is phase-delayed by 90 degrees with respect to the output terminal 32b, the equal distribution circuit 4 which equally distributes the power-feed signal output from the output terminal 32a and outputs the signal to the second and fourth antenna elements 2b and 2d, and the unequal distribution circuit 5 which distributes the power-feed signal output from the output terminal 32b and outputs the signal to the first, third and fifth antenna elements 2a, 2c and 2e. The unequal distribution circuit 5 distributes power so that the electrical power output to the first and fifth antenna elements 2a and 2e is equal and the sum of the electrical power output to the first and fifth antenna elements 2a and 2e is not more than the electrical power output to the third antenna element 2c. A phase-inverted power is fed to the third antenna element 2c and one of the second and fourth antenna elements 2b and 2d.

Such configuration allows a circuit with a simple configuration to feed power to five antenna elements 2 and it is possible to easily achieve the FWHM (30° to 33°±5°) suitable for a six-sector base station, thereby realizing the power feed circuit 1 which has a simple structure and is for dual-beam antenna.

The power feed circuit 1 has a simple circuit configuration and thus can suppress an increase in size of the circuit and reduce internal loss.

In addition, in the power feed circuit 1, the power distribution ratio can be highly freely adjusted since the distribution ratio of the power supplied to each antenna element 2 can be easily adjusted by adjusting the power distribution ratio at the unequal distribution circuit 5, and it is possible to easily achieve low sidelobe directional characteristics.

Furthermore, in the power feed circuit 1, power fed to the first and fifth antenna elements 2a and 2e is equal and power fed to the second and fourth antenna elements 2b and 2d is equal. Thus, the power distribution ratio is always symmetric and symmetric radiation directionality is obtained.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A power feed circuit (1) for feeding power to first through fifth antenna elements (2a-2e) sequentially arranged in a horizontal direction, the power feed circuit (1) comprising: a 90-degree hybrid circuit (3) that comprises two input terminals (31a, 31b) for inputting a power-feed signal and two output terminals (32a, 32b), equally distributes electrical power input from the two input terminals (31a, 31b) and outputs the distributed electrical power from the two output terminals (32a, 32b) and is configured such that the power-feed signal input from one (31a) of the input terminals is output to an other (32b) of the output terminals by being phase-delayed by 90 degrees relative to one (32a) of the output terminals, and that the power-feed signal input from an other (31b) of the input terminals is output to the one (32a) of the output terminals by being phase-delayed by 90 degrees relative to the other (32b) of the output terminals; an equal distribution circuit (4) by which the power-feed signal output from the one (32a) of the output terminals is equally distributed and output to the second and fourth antenna elements (2b, 2d); and a distribution circuit (5) by which the power-feed signal output from the other (32b) of the output terminals is distributed and output to the first, third and fifth antenna elements (2a, 2c, 2e), wherein the distribution circuit (5) distributes such that electrical power output to the first and fifth antenna elements (2a, 2e) is equal and a sum of electrical power output to the first and fifth antenna elements (2a, 2e) is not more than electrical power output to the third antenna element (2c), and wherein a phase-inverted power is fed to the third antenna element (2c) and either one of the second and fourth antenna element (2b, 2d).

[2] The power feed circuit (1) defined by [1], wherein the distribution circuit (5) comprises a 1-input/3-output unequal distribution circuit (5).

[3] The power feed circuit (1) defined by [1] or [2], wherein the phase-inverted power is fed by a phase-inverted power feeding to the third antenna element (2b) and either one of the second and fourth antenna elements (2b, 2d).

[4] The power feed circuit (1) defined by any one of [1] to [3], wherein the distribution circuit (5) distributes power so that the sum of the electrical power output to the first and fifth antenna elements (2a, 2e) is less than the electrical power output to the third antenna element (2c).

[5] An antenna device (100), comprising: first through fifth antenna elements (2a-2d) sequentially arranged in a horizontal direction; and a power feed circuit (1) that feeds power to each of the antenna elements (2a-2d), wherein the power feed circuit (1) comprises a 90-degree hybrid circuit (3) that comprises two input terminals (31a, 31b) for inputting a power-feed signal and two output terminals (32a, 32b), equally distributes electrical power input from the two input terminals (31a, 31b) and outputs the same from the two output terminals (32a, 32b), and is configured that the power-feed signal input from one (31a) of the input terminals and output to the other (32b) of the output terminals is phase-delayed by 90 degrees with respect to one (32a) of the output terminals, and the power-feed signal input from the other (31b) of the input terminals and output to the one (32a) of the output terminals is phase-delayed by 90 degrees with respect to the other (32b) of the output terminals; an equal distribution circuit (4) that equally distributes the power-feed signal output from the one (32a) of the output terminals and outputs the signal to the second and fourth antenna elements (2b, 2d); and a distribution circuit (5) that distributes the power-feed signal output from the other (32b) of the output terminals and outputs the signal to the first, third and fifth antenna elements (2a, 2c, 2e), wherein the distribution circuit (5) distributes power so that the electrical power output to the first and fifth antenna elements (2a, 2e) is equal and the sum of the electrical power output to the first and fifth antenna elements (2a, 2e) is not more than the electrical power output to the third antenna element (2c), and a phase-inverted power is fed to the third antenna element (2c) and either the second antenna element (2b) or the fourth antenna element (2d).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

For example, although a slot-coupled patch antenna is used as the antenna element 101 in the embodiment, the specific form, etc., of the antenna element 101 is not limited thereto. For example, the antenna element 101 may be a dipole antenna.

In addition, by using an antenna device to which the power feed circuit 1 of the invention is applied, it is possible to realize a DOA (direction-of-arrival) estimation system which estimates a direction of the incoming radio wave based on the level difference and phase difference between the incident signals output from the input terminals 31a and 31b, even though it is not mentioned in the embodiment.

REFERENCE SIGNS LIST

1 POWER FEED CIRCUIT
2 FIRST ANTENNA ELEMENT
2a FIRST ANTENNA ELEMENT
2b SECOND ANTENNA ELEMENT
2c THIRD ANTENNA ELEMENT
2d FOURTH ANTENNA ELEMENT
2e FIFTH ANTENNA ELEMENT
3 90-DEGREE HYBRID CIRCUIT
31a, 31b INPUT TERMINAL
32a, 32b OUTPUT TERMINAL
4 EQUAL DISTRIBUTION CIRCUIT
5 UNEQUAL DISTRIBUTION CIRCUIT (DISTRIBUTION CIRCUIT)

The invention claimed is:

1. A power feed circuit for feeding power to first through fifth antenna elements sequentially arranged in a horizontal direction, the power feed circuit comprising:
   a 90-degree hybrid circuit that comprises two input terminals for inputting a power-feed signal and two output terminals, equally distributes electrical power input from the two input terminals and outputs the distributed electrical power from the two output terminals and is configured such that the power-feed signal input from one of the input terminals is output to an other of the output terminals by being phase-delayed by 90 degrees relative to one of the output terminals, and that the power-feed signal input from an other of the input terminals is output to the one of the output terminals by being phase-delayed by 90 degrees relative to the other of the output terminals;
   an equal distribution circuit by which the power-feed signal output from the one of the output terminals is equally distributed and output to the second and fourth antenna elements; and
   a distribution circuit by which the power-feed signal output from the other of the output terminals is distributed and output to the first, third and fifth antenna elements,
   wherein the distribution circuit distributes such that electrical power output to the first and fifth antenna elements is equal and that a sum of electrical power output to the first and fifth antenna elements is not more than electrical power output to the third antenna element, and
   wherein a phase-inverted power is fed to the third antenna element and either one of the second and fourth antenna elements.

2. The power feed circuit according to claim 1, wherein the distribution circuit comprises a 1-input/3-output unequal distribution circuit.

3. The power feed circuit according to claim 1, wherein the phase-inverted power is fed by a phase-inverted power feeding to the third antenna element and either one of the second and fourth antenna elements.

4. The power feed circuit according to claim 1, wherein the distribution circuit distributes such that the sum of electrical power output to the first and fifth antenna elements is less than the electrical power output to the third antenna element.

5. An antenna device, comprising:
   first through fifth antenna elements sequentially arranged in a horizontal direction; and
   a power feed circuit that feeds power to each of the antenna elements,
   wherein the power feed circuit comprises a 90-degree hybrid circuit that comprises two input terminals for inputting a power-feed signal and two output terminals, equally distributes electrical power input from the two input terminals and outputs the same from the two output terminals and is configured such that the power-feed signal input from one of the input terminals is output to an other of the output terminals by being phase-delayed by 90 degrees relative to one of the output terminals, and that the power-feed signal input from an other of the input terminals is output to the one of the output terminals by being phase-delayed by 90 degrees relative to the other of the output terminals, an equal distribution circuit by which the power-feed signal output from the one of the output terminals is equally distributed and output to the second and fourth antenna elements, and a distribution circuit by which the power-feed signal output from the other of the output terminals is distributed and output to the first, third and fifth antenna elements, wherein the distribution circuit distributes such that electrical power output to the first and fifth antenna elements is equal and a sum of electrical power output to the first and fifth antenna elements is not more than electrical power output to the third antenna element, and wherein a phase-inverted power is fed to the third antenna element and either one of the second and fourth antenna elements.

6. The power feed circuit according to claim 2, wherein the phase-inverted power is fed by a phase-inverted power feeding to the third antenna element and either one of the second and fourth antenna elements.

7. The power feed circuit according to claim 2, wherein the distribution circuit distributes such that the sum of electrical power output to the first and fifth antenna elements is less than the electrical power output to the third antenna element.

8. The power feed circuit according to claim 3, wherein the distribution circuit distributes such that the sum of electrical power output to the first and fifth antenna elements is less than the electrical power output to the third antenna element.

* * * * *